United States Patent
Bunazawa et al.

(10) Patent No.: US 12,444,251 B2
(45) Date of Patent: Oct. 14, 2025

(54) VEHICLE DIAGNOSTIC SYSTEM

(71) Applicant: TOYOTA JIDOSHA KABUSHIKI KAISHA, Toyota (JP)

(72) Inventors: Hideaki Bunazawa, Nagoya (JP); Shintaro Mukogawa, Nagoya (JP); Rikako Zenibana, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 324 days.

(21) Appl. No.: 18/340,891

(22) Filed: Jun. 26, 2023

(65) Prior Publication Data

US 2024/0257584 A1  Aug. 1, 2024

(30) Foreign Application Priority Data

Feb. 1, 2023  (JP) ................. 2023-014134

(51) Int. Cl.
*G07C 5/08* (2006.01)
*G06N 3/08* (2023.01)

(52) U.S. Cl.
CPC ............. *G07C 5/0816* (2013.01); *G06N 3/08* (2013.01); *G07C 5/0808* (2013.01)

(58) Field of Classification Search
CPC ....... G07C 5/0816; G07C 5/0808; G06N 3/08
See application file for complete search history.

(56) References Cited

U.S. PATENT DOCUMENTS

| 10,679,434 B2 * | 6/2020 | Okude ................. G06F 30/15 |
| 2021/0049444 A1 * | 2/2021 | Bielby ................. G07C 5/0808 |
| 2024/0043023 A1 | 2/2024 | Bunazawa |

FOREIGN PATENT DOCUMENTS

| JP | 2014222189 A | 11/2014 |
| JP | 2024022176 A | 2/2024 |

OTHER PUBLICATIONS

Sam Blake, A guide to generating probability distributions with neural networks, https://medium.com/hal24k-techblog/a-guide-to-generating-probability-distributions-with-neural-networks-ffc4efacd6a4 (Year: 2019).*

* cited by examiner

*Primary Examiner* — Aryan E Weisenfeld

(57) ABSTRACT

In a vehicle diagnostic system, a storage device stores data of a learned model and probability distribution data obtained by generating pieces of generated data by a learned model using pieces of sound data recorded using vehicles with identified types of anomalies and by obtaining, for each of the types of anomalies, a probability distribution of a loss variable. Processing circuitry is configured to execute a loss calculation process that generates the pieces of the generated data using pieces of diagnostic sound data and obtains data of a probability distribution of a loss variable in the pieces of the generated data as sample data and a diagnostic process that determines which probability distribution of an anomaly the sample data matches and outputs a diagnosis result indicating that a type of anomaly corresponding to the probability distribution determined to match the sample data has occurred in the target vehicle.

5 Claims, 3 Drawing Sheets

VEHICLE DIAGNOSTIC SYSTEM

1. FIELD

The present disclosure relates to a vehicle diagnostic system.

2. DESCRIPTION OF RELATED ART

Japanese Laid-Open Patent Publication No. 2014-222189 discloses an abnormal sound determination device that determines whether a specific abnormal sound is included in a vehicle traveling sound using sound data obtained by recording the vehicle traveling sound generated when the vehicle travels. The abnormal sound determination device performs frequency analysis on sound data to obtain a waveform, and calculates the area of a portion exceeding a threshold value in the waveform. Then, the abnormal sound determination device determines whether an abnormal sound has been produced by comparing the area of the portion exceeding the threshold value with a predetermined determination value.

The abnormal sound determination device can determine whether an abnormal sound has been produced, but cannot determine the type of an abnormal sound. Thus, it is desired that the vehicle diagnostic system is capable of diagnosing a target vehicle, which is to be diagnosed, including determination of the type of an anomaly by using sound data obtained by recording sound produced from the target vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a vehicle diagnostic system that diagnoses a target vehicle using sound data obtained by recording a sound produced from the target vehicle. The target vehicle is a vehicle to be diagnosed. The vehicle diagnostic system includes processing circuitry and a storage device. The storage device stores data of a learned model trained by supervised learning to generate operation data from training sound data using training data including the training sound data and the operation data. The training sound data is recorded while operating a reference vehicle in which no anomaly has occurred. The operation data indicates an operation status of the reference vehicle collected simultaneously with the training sound data. The storage device further stores probability distribution data obtained by generating pieces of generated data that is the operation data generated by the learned model using pieces of sound data recorded using vehicles in which types of anomalies are identified and by obtaining, for each of the types of anomalies, a probability distribution of a loss variable indicating a magnitude of an error of each of the pieces of the generated data from the operation data collected simultaneously with the sound data. The processing circuitry is configured to execute a loss calculation process that generates the pieces of the generated data by the learned model using pieces of diagnostic sound data recorded while operating the target vehicle and obtains data of a probability distribution of a loss variable in the pieces of the generated data as sample data and a diagnostic process that determines which probability distribution of an anomaly the sample data matches using the sample data and the probability distribution data and outputs a diagnosis result indicating that a type of anomaly corresponding to the probability distribution that is determined to match the sample data has occurred in the target vehicle.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a vehicle diagnostic system will be described with reference to FIGS. 1 to 6.

Configuration of Vehicle Diagnostic System

Figure 1:
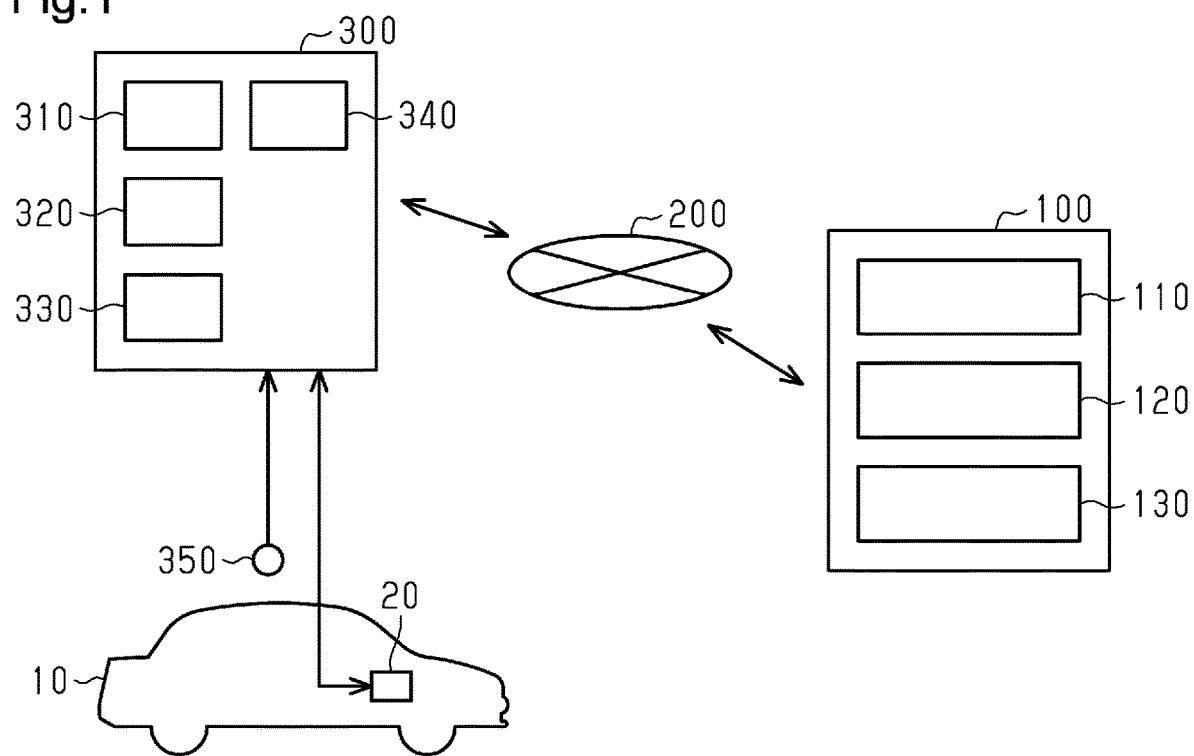
FIG. 1 is a schematic diagram showing an embodiment of a vehicle diagnostic system.

As shown in FIG. 1, the vehicle diagnostic system includes a data center 100 and a data acquisition device 300. The data center 100 is communicably connected to the data acquisition device 300 via a communication network 200. The data center 100 includes processing circuitry 110 and a storage device 120 that stores a program. The processing circuitry 110 executes the program stored in the storage device 120 to execute various processes. The data center 100 further includes a communication device 130.

The data acquisition device 300 is, for example, a personal computer. The data acquisition device 300 includes processing circuitry 310 and a storage device 320 that stores a program. The processing circuitry 310 executes the program stored in the storage device 320 to execute various processes. The data acquisition device 300 includes a communication device 330. In this embodiment, the data acquisition device 300 is connected to the data center 100 via the communication network 200 through wireless communication. The data acquisition device 300 includes a display device 340 that displays information. The data acquisition device 300 includes a microphone 350.

The vehicle diagnostic system diagnoses a target vehicle 10, which is a vehicle to be diagnosed. To perform diagnosis, the microphone 350 is installed at a predetermined position from the target vehicle 10. Further, the data acquisition device 300 is connected to a vehicle control unit 20 of the target vehicle 10. Then, a person controls the target vehicle 10 to operate the target vehicle 10 in a measurement driving pattern. The measurement driving pattern is suitable for acquiring data used to perform diagnosis. The measurement driving pattern is a predetermined operation pattern performed for a predetermined period of time. During operation of the target vehicle 10 in the measurement driving pattern, the data acquisition device 300 records a sound with the microphone 350. The data acquisition device 300 acquires operation data indicating the operation status of the target vehicle 10 at the same time as recording sound data.

The vehicle control unit 20 controls components of the target vehicle 10. Various sensors that detect the state of the target vehicle 10 are connected to the vehicle control unit 20. When the data acquisition device 300 is connected to the vehicle control unit 20, the data acquisition device 300 can acquire information related to the target vehicle 10 via the vehicle control unit 20.

Outline of Diagnosis by Vehicle Diagnostic System

As described above, in the vehicle diagnostic system, the data acquisition device 300 is connected to the vehicle control unit 20 of the target vehicle 10 to diagnose the target vehicle 10. During operation of the target vehicle 10, the data acquisition device 300 records a sound with the microphone 350. The data acquisition device 300 sends, for example, data of the recorded sound to the data center 100. Then, the data center 100 diagnoses the target vehicle 10 using the data received from the data acquisition device 300.

The data acquisition device 300 records sound data recorded by the microphone 350 in the storage device 320 as diagnostic sound data while operating the target vehicle 10 in the measurement driving pattern. The data acquisition device 300 stores, in the storage device 320, the operation data collected simultaneously with the sound data. For example, when the transmission of the target vehicle 10 is diagnosed, the operation data includes an engine rotation speed NE, an input rotation speed Nin, an output rotation speed Nout, and a gear ratio. The data acquisition device 300 stores, in the storage device 320 as a dataset corresponding to the predetermined period of time, the operation data including the diagnostic sound data collected in this manner.

The data acquisition device 300 extracts a dataset corresponding to the predetermined period of time stored in the storage device 320 while changing an extraction start time, and formats the dataset into diagnostic data. The diagnostic data is extracted for each data in a range of a window Tw having a time width shorter than the predetermined period of time. That is, the data acquisition device 300 extracts data corresponding to a period shorter than the predetermined period of time from the dataset, and formats the data into diagnostic data. In a data formatting process that formats the diagnostic sound data, the data acquisition device 300 converts the diagnostic sound data into a mel spectrogram and handles the mel spectrogram as image data. The vertical axis of the mel spectrogram represents a frequency indicated by the mel scale, and the horizontal axis represents time. In the mel spectrogram, intensity is represented by the differences in color. A portion having a lower intensity is displayed in a dark blue color, and a portion having a higher intensity is displayed in a bright red color. The sound data included in one dataset corresponding to the predetermined period of time is one mel spectrogram corresponding to the predetermined period of time. The data acquisition device 300 sends the formatted diagnostic data to the data center 100. In the vehicle diagnostic system, a predetermined number of datasets are used to diagnose one target vehicle 10. Therefore, an operator operates the target vehicle 10 in the measurement driving pattern and repeats a task of creating the dataset a predetermined number of times. Thus, the operator creates a predetermined number of pieces of diagnostic data. The data acquisition device 300 sends the predetermined number of pieces of diagnostic data to the data center 100. Upon receiving the diagnostic data, the data center 100 stores the diagnostic data in the storage device 120. Then, the data center 100 executes the routine illustrated in FIG. 2 to diagnose the target vehicle 10. The routine is executed by the processing circuitry 110 of the data center 100. In the following description, the number of each process is represented by the letter S followed by a numeral.

Figure 2:
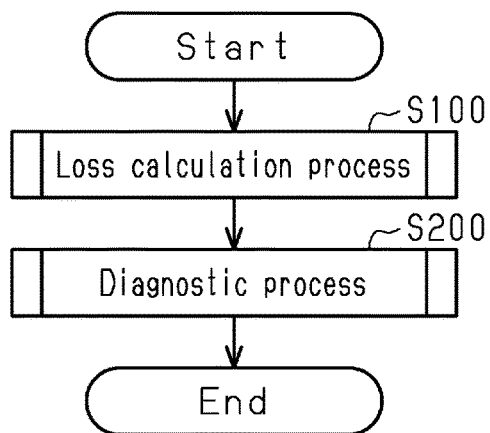
FIG. 2 is a flowchart illustrating the flow of processes related to diagnosis of the target vehicle.

As shown in FIG. 2, the data center 100 executes a loss calculation process (S100) and a diagnostic process (S200) to diagnose the target vehicle 10. The loss calculation process (S100) is a process that calculates a loss variable LOS by inputting the diagnostic sound data included in the diagnostic data to the learned model. The loss variable LOS is a value indicating the magnitude of an error in the generated data generated by the learned model using the diagnostic sound data.

The learned model is trained using a large amount of training data including training sound data and operation data collected simultaneously with the training sound data. Further, the learned model is trained by supervised learning so that the operation data can be generated from the training sound data. For example, the data center 100 handles the diagnostic sound data as image data. Thus, the data center 100 uses a model partially using ResNet-18, which is an image classification model. ResNet-18 is a pre-trained image classification model learned on an ImageNet dataset. ResNet-18 is trained with the data of over one million images and can classify input images into one thousand categories. The learned model stored in the storage device 120 of the data center 100 is obtained by performing transfer learning on pre-trained ResNet-18. The learned model is obtained by replacing the output layer for classification of ResNet-18 with a neural network MLP and training the neural network MLP by supervised learning. The training refers to adjusting the weight and bias of each layer of the neural network MLP. The training sound data is recorded while operating a reference vehicle, which is a vehicle in a state serving as a reference for diagnosis, in the measurement driving pattern. In this example, the reference vehicle is a vehicle that has completed a certain period of break-in operation after manufacturing, undergone thorough maintenance and inspection, and has been confirmed to have no anomalies.

The learned model is optimized to generate the operation data from a sound produced from the reference vehicle. Thus, when the diagnostic sound data produced from the target vehicle 10 in a state different from that of the reference vehicle is input, the data of the operation state cannot be correctly generated. That is, when the state of the target vehicle 10 deviates from that of the reference vehicle, deviation occurs between the operation data stored in the dataset as correct answer data and the generated data generated from the sound produced from the target vehicle 10. That is, the state of the target vehicle 10 deviates from the state of the reference vehicle by the magnitude of the deviation. As described above, the reference vehicle is in a state that includes no anomaly. Thus, the vehicle diagnostic system diagnoses an anomaly in the target vehicle 10 based on the deviation; that is, the error in the generated data. The manner in which the error appears differs depending on the type of anomaly.

Figure 3:
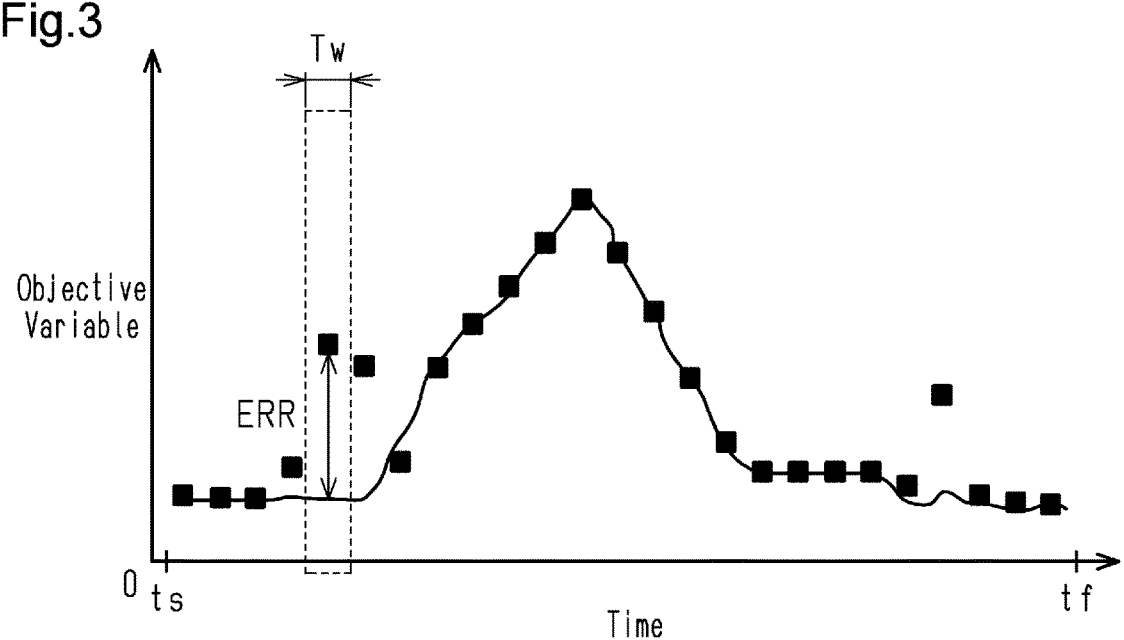
FIG. 3 is a graph illustrating the generated data, the operation data, and errors of the generated data.

FIG. 3 is a graph illustrating the operation data, which is correct data, and the generated data, which is generated by the learned model using the diagnostic sound data. The graph of FIG. 3 illustrates only one of the variables included in the operation data. That is, the graph illustrates only one of objective variables, which are outputs of the learned model. In FIG. 3, the operation data is indicated by a solid line. In FIG. 3, the generated data is indicated by square symbols. In FIG. 3, time ts is a start time of the measurement operation pattern, and time tf is an end time of the measurement operation pattern. That is, FIG. 3 illustrates the operation data and the generated data in one dataset. The learned model outputs values of the generated data in the window Tw one by one for each variable based on the data in the range of the window Tw formatted into the list. An error ERR indicates deviation (error) of the generated data from the operation data. The error ERR increases as the state of the target vehicle 10 deviates from the state of the reference vehicle. Thus, the vehicle diagnostic system calculates the loss variable LOS, which is the sum of the errors ERR of all the variables included in the generated data generated from one dataset, through the loss calculation process. Accordingly, one loss variable LOS is calculated for one dataset. The loss variable LOS only needs to indicate the magnitude of an error. Hence, the loss variable LOS is not limited to a simple sum of the errors ERR. For example, a process of excluding an outlier from the errors ERR may be performed as pre-processing of calculating the loss variable LOS, and a sum of the errors ERR excluding the outlier may be set as the loss variable LOS.

Figure 4:
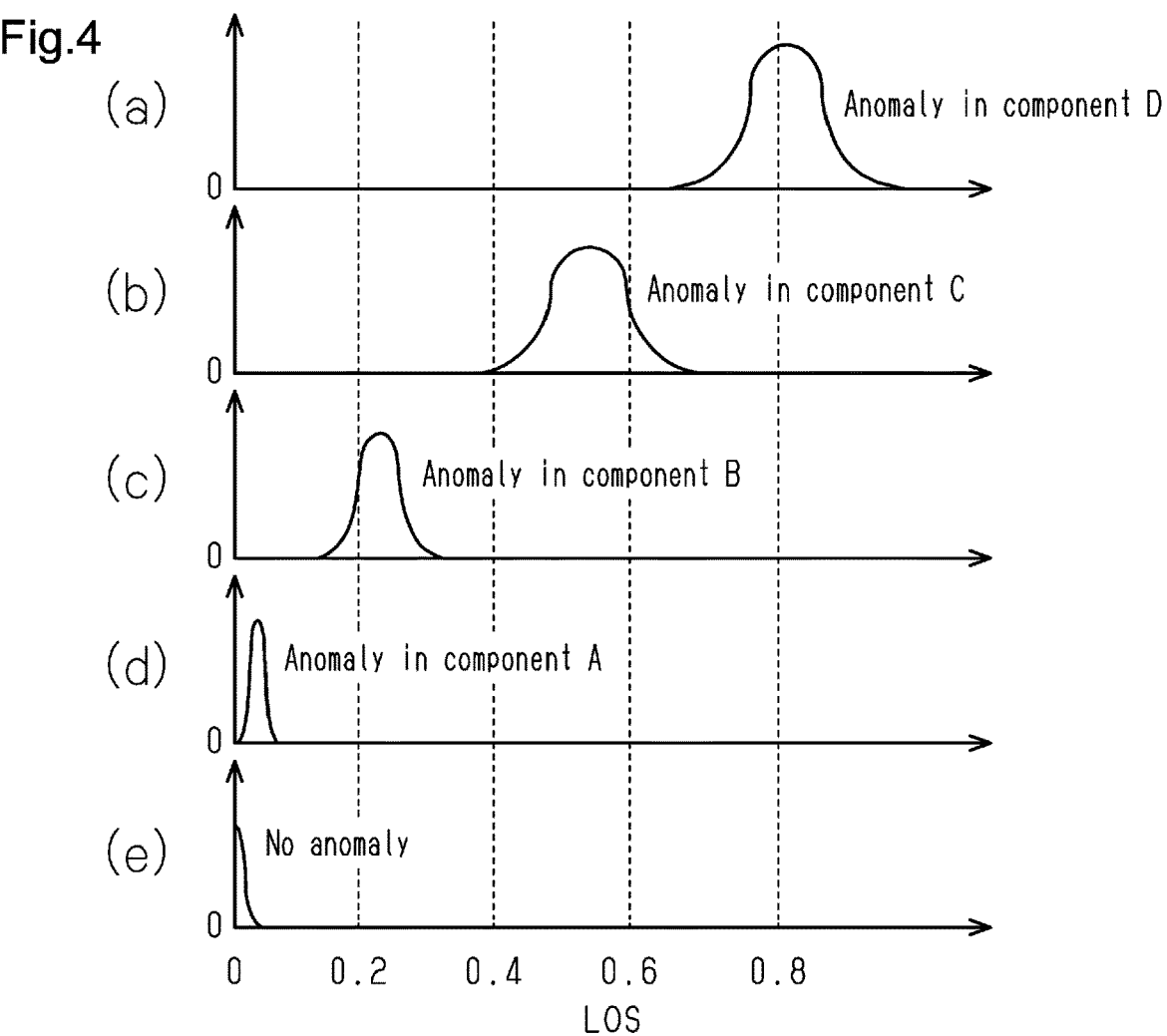
FIG. 4 is a graph illustrating an example of the probability distribution of the loss variable.

FIG. 4 illustrates an example of the probability distributions of the loss variable LOS based on whether an anomaly has occurred and based on the type of anomaly. Section (a) of FIG. 4 illustrates the probability distribution of the loss variable LOS in a test vehicle in which an anomaly has occurred in component D. Section (b) of FIG. 4 illustrates the probability distribution of the loss variable LOS in a test vehicle in which an anomaly has occurred in component C. Section (c) of FIG. 4 illustrates the probability distribution of the loss variable LOS in a test vehicle in which an anomaly has occurred in component B. Section (d) of FIG. 4 illustrates the probability distribution of the loss variable LOS in a test vehicle in which an anomaly has occurred in component A. Section (e) of FIG. 4 illustrates the probability distribution of the loss variable LOS in the reference vehicle in which no anomaly has occurred in component A. These probability distributions are obtained by preparing test vehicles in which the type of anomaly is identified and by using pieces of sound data recorded by repeating test traveling in the measurement driving pattern for each test vehicle a number of times. For example, ten test vehicles in which an anomaly has occurred in component D are prepared, and pieces of sound data are recorded by performing test traveling a number of times with the ten test vehicles. The sound data recorded in this manner is used to obtain the probability distribution of the loss variable LOS in the case in which an anomaly has occurred in component D. Another probability distribution based on the type of anomaly and a probability distribution in a case in which no anomaly has occurred are obtained using the same method.

As shown in FIG. 4, the probability distribution of the loss variable LOS changes depending on whether an anomaly has occurred and depending on the type of anomaly. The learned model is optimized to generate, from the sound data, the operation data of the reference vehicle in a state in which no anomaly has occurred. Thus, the probability distribution of the loss variable LOS in the case in which no anomaly has occurred has an average of 0.

The storage device 120 of the data center 100 stores probability distribution data obtained by obtaining the probability distribution of the loss variable LOS for each type of anomaly and data of the probability distribution of the reference vehicle.

The vehicle diagnostic system performs the diagnostic process using the data of the probability distribution of the reference vehicle stored in the storage device 120 and the probability distribution data obtained for each type of anomaly.

Hereinafter, the contents of the loss calculation process and the diagnostic process will be described with reference to flowcharts.

Loss Calculation Process

As described above, when receiving a predetermined number of pieces of diagnostic data, the data center 100 stores the received pieces of diagnostic data in the storage device 120. Then, the processing circuitry 110 of the data center 100 executes the routine illustrated in FIG. 2.

As shown in FIG. 2, when starting the routine, the processing circuitry 110 first executes the loss calculation process (S100).

Figure 5:
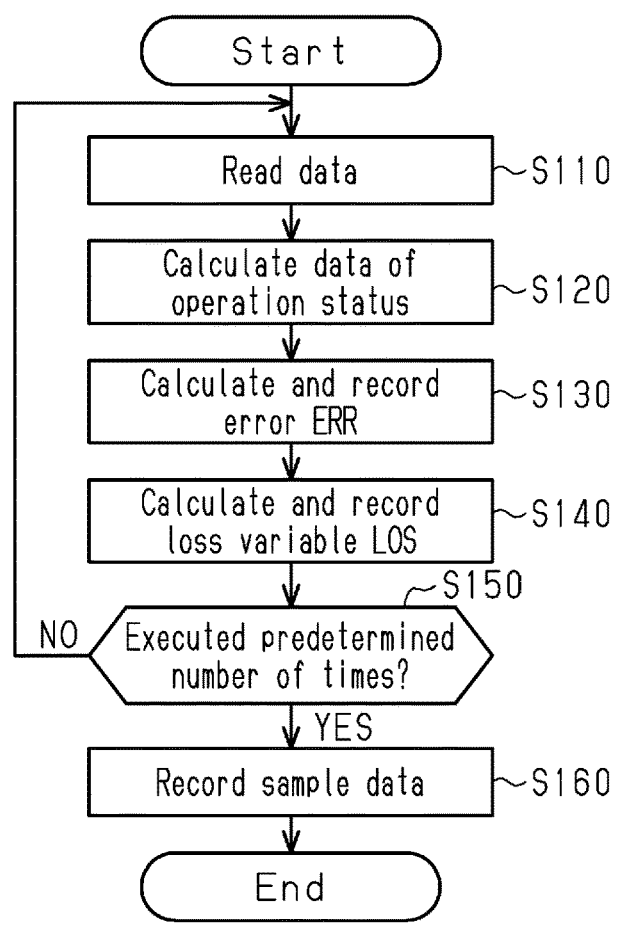
FIG. 5 is a flowchart illustrating the flow of processes in the loss calculation process.

FIG. 5 is a flowchart illustrating the flow of processes in the routine of the loss calculation process. When starting the routine, the processing circuitry 110 reads one piece of diagnostic data (S110). Then, the processing circuitry 110 sequentially inputs the lists included in the read diagnostic data to the learned model, and calculates each piece of data of the operation status (S120). That is, the processing circuitry 110 generates pieces of generated data. Next, the processing circuitry 110 calculates, for all pieces of the generated data, the magnitudes of the errors ERR in the generated data for each of the variables included in the operation data collected simultaneously with the diagnostic sound data (S130). Then, the processing circuitry 110 records the calculated errors ERR in the storage device 120 (S130).

Subsequently, the processing circuitry 110 calculates the loss variable LOS (S140). Then, the processing circuitry 110 records the calculated loss variable LOS in the storage device 120 (S140). When recording the loss variable LOS, the processing circuitry 110 determines whether the loss variable LOS has been calculated a predetermined number of times (S150). This process determines whether the calculation of the loss variable LOS for all of the predetermined number of pieces of diagnostic data is completed.

When determining that the calculation of the loss variable LOS has not been executed the predetermined number of times (S150: NO), the processing circuitry 110 returns the process to S110. Then, the processing circuitry 110 reads one of the pieces of diagnostic data for which the loss variable LOS has not been calculated (S110), and executes the processes from S120 to S140. When determining that the calculation of the loss variable LOS has been executed the predetermined number of times (S150: YES), the processing circuitry 110 advances the process to S160. That is, the processing circuitry 110 repeats the processes from S110 to S140 until the calculation of the loss variable LOS for all of the predetermined number of pieces of diagnostic data is completed. When the calculation of the loss variable LOS for all of the predetermined number of pieces of diagnostic data is completed, the processing circuitry 110 advances the process to S160.

The processing circuitry 110 records the probability distributions of a predetermined number of the calculated loss variables LOS in the storage device 120 as sample data (S160). Then, the processing circuitry 110 ends the routine.

As illustrated in FIG. 2, when the loss calculation process (S100) ends, the processing circuitry 110 executes the diagnostic process (S200).

Diagnostic Process

In the diagnostic process, the processing circuitry 110 outputs a diagnosis result by using the sample data, the probability distribution data, and the data of the probability distribution for the reference vehicle. Specifically, the processing circuitry 110 determines which probability distribution of an anomaly the sample data matches. Then, the processing circuitry 110 outputs a diagnosis result indicating that the type of anomaly corresponding to the probability distribution determined to match the sample data has occurred in the target vehicle 10. The processing circuitry 110 also determines whether the sample data matches the data of the probability distribution for the reference vehicle. When determining that the sample data matches the data of the probability distribution for the reference vehicle, the processing circuitry 110 outputs a diagnosis result indicating that no anomaly has occurred in the target vehicle 10.

Figure 6:
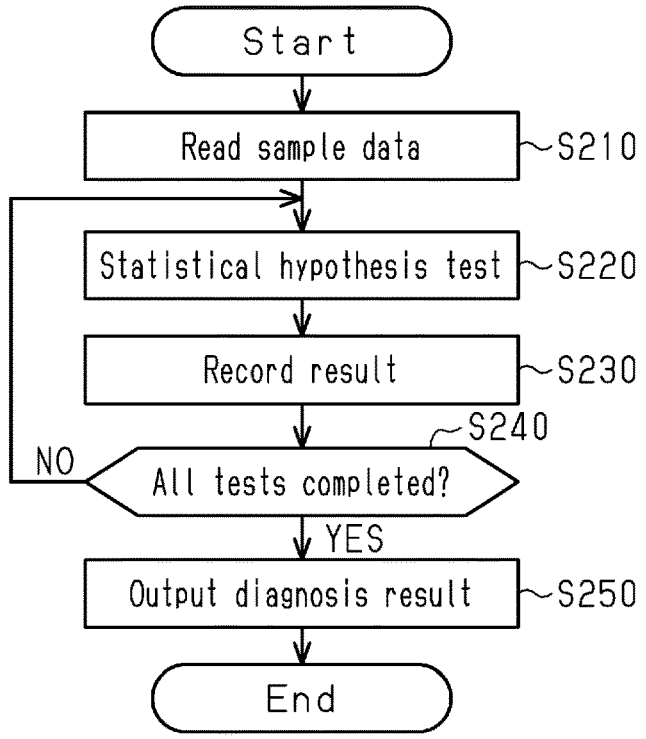
FIG. 6 is a flowchart illustrating the flow of processes in the diagnostic process.

FIG. 6 is a flowchart illustrating the flow of processes in the routine of the diagnostic process. When starting the routine, the processing circuitry 110 reads the sample data recorded in the storage device 120 (S210).

Next, the processing circuitry 110 performs a statistical hypothesis test (S220) to perform diagnosis including determination of the type of anomaly as well as determination of whether an anomaly has occurred in the target vehicle 10.

Specifically, the processing circuitry 110 first selects one probability distribution. That is, the processing circuitry 110 selects one of the probability distributions respectively corresponding to the types of anomalies included in the probability distribution data or the probability distribution for the reference vehicle. Then, the processing circuitry 110 sets the selected probability distribution as a population. The processing circuitry 110 determines whether the sample data matches the probability distribution in the population through the statistical hypothesis test. The processing circuitry 110 sets a null hypothesis that contradicts an alternative hypothesis in which the sample data does not match the population. If the null hypothesis cannot be rejected, the processing circuitry 110 determines that the sample data matches the population. In this case, the null hypothesis is a hypothesis that the sample data matches the population. The statistical hypothesis test includes a t-test, an F-test, a chi-squared test, and the like depending on the type of test statistics, and which method is to be adopted may be determined according to the distribution of data.

In this example, the significance level is set to 0.05, for example. The significance level may be set to 0.01. In this example, the processing circuitry 110 obtains a test statistic from the sample data. Then, the processing circuitry 110 calculates a p-value, which is the probability that the test statistic has a value equal to the test statistic calculated from the sample data when the null hypothesis is assumed to be correct. The processing circuitry 110 then compares the p-value with the significance level. If the p-value is less than the significance level, the processing circuitry 110 rejects the null hypothesis. Then, the processing circuitry 110 determines that the sample data does not match the population. When the p-value is greater than or equal to the significance level, the processing circuitry 110 determines that the sample data matches the population because the null hypothesis cannot be rejected.

Next, the processing circuitry 110 records the result of the statistical hypothesis test in the storage device 120 (S230). Then, the processing circuitry 110 determines whether all of the probability distributions corresponding to the types of anomalies included in the probability distribution data and the probability distribution for the reference vehicle have been tested (S240).

When determining that all the tests are not completed (S240: NO), the processing circuitry 110 returns the process to S220. The processing circuitry 110 performs a statistical hypothesis test using, as a new population, probability distributions for which the test has not been completed (S220). Then, the processing circuitry 110 records the result in the storage device 120 (S230). When determining that all the tests are completed (S240: YES), the processing circuitry 110 advances the process to S250. In other words, the processing circuitry 110 repeats the processes of S220 and S230 until the test is completed for all of the probability distributions corresponding to the types of anomalies included in the probability distribution data and the probability distribution for the reference vehicle. In this manner, the processing circuitry 110 sets, as populations, the probability distributions respectively corresponding to the types of anomalies included in the probability distribution data or the probability distribution for the reference vehicle, and performs a statistical hypothesis test on each population. Accordingly, the processing circuitry 110 determines whether the sample data matches the probability distribution in each population.

When the tests for all of the probability distributions respectively corresponding to the types of anomalies included in the probability distribution data and the probability distribution for the reference vehicle is completed, the processing circuitry 110 advances the process to S250.

Next, the processing circuitry 110 outputs a diagnosis result of the target vehicle 10. Specifically, the processing circuitry 110 refers to the test result recorded in the storage device 120, and outputs a diagnosis result indicating that the anomaly corresponding to the population that is determined to match the sample data has occurred in the target vehicle 10. When determining that the sample data matches the data of the probability distribution for the reference vehicle, the processing circuitry 110 outputs a diagnosis result indicating that no anomaly has occurred in the target vehicle 10.

For example, when determining that the sample data matches the probability distribution of the loss variable LOS in the test vehicle in which an anomaly has occurred in component B, the processing circuitry 110 outputs a diagnosis result indicating that an anomaly has occurred in component B. For example, when determining that the sample data matches the probability distribution of the loss variable LOS in the reference vehicle, the processing circuitry 110 outputs a diagnosis result indicating that no anomaly has occurred in the target vehicle 10.

When outputting the diagnosis result, the processing circuitry 110 ends the routine. That is, the processing circuitry 110 ends the diagnostic process and ends the series of routines illustrated in FIG. 2.

The data acquisition device 300 that has received the diagnosis result displays the diagnosis result received from the data center 100 on the display device 340 as a diagnosis result of the target vehicle 10.

Operation of Present Embodiment

The processing circuitry 110 generates generated data that is obtained by restoring the operation data from the diagnostic data using the learned model. Then, the processing circuitry 110 executes the loss calculation process (S100), which calculates the loss variable LOS in the generated dataset to create a sample data.

In the diagnostic process (S200), the processing circuitry 110 determines which population the sample matches. Then, the processing circuitry 110 outputs a diagnosis result corresponding to the population that the sample data is determined to match.

The vehicle diagnostic system uses the loss variable LOS calculated by comparing the operation data with the generated data that has been calculated using the learned model. In the loss variable LOS, a difference in state between the target vehicle 10 and the reference vehicle appears. Further, in the loss variable LOS, a feature corresponding to the type of anomaly that has occurred in the target vehicle 10 also appears. Thus, a feature corresponding to the type of anomaly that has occurred in the target vehicle 10 appears in the probability distribution of the loss variable LOS.

Accordingly, the vehicle diagnostic system collates the probability distribution of the loss variable LOS of the target vehicle 10 with the probability distribution data obtained by obtaining, for each type of anomaly, the probability distributions of the loss variables LOS of vehicles for which the types of anomalies have been identified. This allows the vehicle diagnostic system to identify the type of anomaly in the target vehicle 10.

Advantages of Present Embodiment (1) From the data of recorded sound, the vehicle diagnostic system performs diagnosis including determination of the type of anomaly.

(2) The storage device 120 stores the data of the probability distribution for the reference vehicle in addition to the probability distribution data. In the diagnostic process, the processing circuitry 110 also determines whether the sample data matches the data of the probability distribution for the reference vehicle. When determining that the sample data matches the data of the probability distribution for the reference vehicle, the processing circuitry 110 outputs a diagnosis result indicating that no anomaly has occurred in the target vehicle 10. This allows the vehicle diagnostic system to diagnose that no anomaly has occurred in the target vehicle 10.

(3) The learned model generates generated data from the diagnostic sound data including the image data of a spectrogram obtained by performing frequency analysis on sound data. The vehicle diagnostic system uses the image data obtained by performing frequency analysis on sound data. This allows the vehicle diagnostic system to efficiently extract the feature included in the sound data and perform the loss calculation process.

Modifications

The present embodiment may be modified as follows. The present embodiment and the following modifications can be combined as long as they remain technically consistent with each other.

The data used as the measurement data is not limited to a mel spectrogram. For example, a spectrogram obtained by performing wavelet transform on sound data may be used. Alternatively, a spectrogram obtained by performing short-time Fourier transform on sound data may be used. Sound data does not have to be converted into image data. For example, a feature may be extracted from sound data and used as diagnostic data. This eliminates the need for using ResNet-18, which handles image data, as the learned model. Although a model obtained by performing transfer learning on ResNet-18 has been explained, the configuration of the model is not limited to such a configuration. The learned model only needs to output the generated data based on the diagnostic data.

The vehicle diagnostic system may include only the data acquisition device 300. In this case, the storage device 320 stores the data of the learned model, the probability distribution data, and the data of the probability distribution for the reference vehicle. In this case, the processing circuitry 310 of the data acquisition device 300 executes the loss calculation process and the diagnostic process.

The data acquisition device 300 does not have to include the microphone 350. Sound data may be acquired from an external device to perform the loss calculation process. The loss calculation process may be performed using pieces of sound data recorded using microphones 350.

In the above embodiment, as the example of the case in which diagnosis of the transmission of the target vehicle 10 is performed, an example in which the data of the rotation speed of a rotation shaft in a power train is included in the operation data has been described. The vehicle diagnostic system may diagnose the target vehicle 10 by diagnosing another unit in the target vehicle 10. For example, the diagnosing of the drive motor may use the data of the engine speed NE, the ignition timing, and the engine load factor as the operation data. For example, the diagnosing of the drive motor may use the data of the rotation speed of an output shaft of a motor as the operation data. The diagnosing of the four-wheel drive vehicle may use the data of the rotation speed of each drive wheel as the operation data.

The example in which the processing circuitry 110 performs a statistical hypothesis test in the diagnostic process has been described. In the diagnostic process, the sample data and the probability distribution data may be used to determine which population the sample data matches the probability distribution. For example, it may be determined whether the average value in the sample data is closest to the average value in the probability distribution of each population, and it may be determined that the sample data matches the probability distribution having the closest average value.

In the above embodiment, the vehicle diagnostic system includes the processing circuitry 110 and the storage device 120, and executes software processing. However, this is merely exemplary. For example, the vehicle diagnostic system may include a dedicated hardware circuit (such as ASIC) that executes at least part of the software processes executed in the above-described embodiments. That is, the vehicle diagnostic system may have any one of the following configurations (A) to (C). (A) The vehicle diagnostic system includes an execution device that executes all the processes in accordance with a program and a storage device that stores the program. That is, the vehicle diagnostic system includes a software execution device. (B) The vehicle diagnostic system includes an execution device that executes some of the processes in accordance with a program, and a storage device. Further, the vehicle diagnostic system includes a dedicated hardware circuit that performs the remaining processes. (C) The vehicle diagnostic system includes a dedicated hardware circuit that executes all the processes. There may be multiple software execution devices and/or dedicated hardware circuits. That is, the above processes may be executed by processing circuitry that includes at least one of a set of one or more software execution devices and a set of one or more dedicated hardware circuits. The storage device (i.e., computer-readable medium) that stores a program includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle diagnostic system that diagnoses a target vehicle using sound data obtained by recording a sound produced from the target vehicle, the target vehicle being a vehicle to be diagnosed, the vehicle diagnostic system comprising:
   processing circuitry; and
   a storage device, wherein
   the storage device stores:
      data of a learned model trained by supervised learning to generate operation data from training sound data using training data including the training sound data and the operation data, the training sound data being recorded while operating a reference vehicle in which no anomaly has occurred, and the operation data indicating an operation status of the reference vehicle collected simultaneously with the training sound data; and
      probability distribution data obtained by generating pieces of generated data that is the operation data generated by the learned model using pieces of sound data recorded using vehicles in which types of anomalies are identified and by obtaining, for each of the types of anomalies, a probability distribution of a loss variable indicating a magnitude of an error of each of the pieces of the generated data from the operation data collected simultaneously with the sound data, and
   the processing circuitry is configured to execute:
      a loss calculation process that generates the pieces of the generated data by the learned model using pieces of diagnostic sound data recorded while operating the target vehicle, and obtains data of a probability distribution of a loss variable in the pieces of the generated data as sample data; and
      a diagnostic process that determines which probability distribution of an anomaly the sample data matches using the sample data and the probability distribution data, and outputs a diagnosis result indicating that a type of anomaly corresponding to the probability distribution that is determined to match the sample data has occurred in the target vehicle.

2. The vehicle diagnostic system according to claim 1, wherein
   the storage device stores data of the probability distribution for the reference vehicle in addition to the probability distribution data, and
   in the diagnostic process, the processing circuitry is configured to:
      determine whether the sample data matches the data of the probability distribution for the reference vehicle; and
      when determining that the sample data matches the data of the probability distribution for the reference vehicle, output a diagnosis result indicating that no anomaly has occurred in the target vehicle.

3. The vehicle diagnostic system according to claim 1, wherein, in the diagnostic process, the processing circuitry is configured to:
   set, as populations, probability distributions respectively corresponding to the types of anomalies included in the probability distribution data;
   determine whether the sample data matches the probability distribution in each of the populations through a statistical hypothesis test; and
   output a diagnosis result indicating that an anomaly corresponding to the population that is determined to match the sample data has occurred in the target vehicle.

4. The vehicle diagnostic system according to claim 1, wherein the learned model is configured to generate the generated data from the diagnostic sound data including image data of a spectrogram that is obtained by performing frequency analysis on the sound data.

5. The vehicle diagnostic system according to claim 1, wherein the loss variable is a sum of errors of all variables included in the generated data generated from the sound data.

* * * * *